United States Patent
Fasula et al.

(10) Patent No.: US 10,801,168 B2
(45) Date of Patent: Oct. 13, 2020

(54) PELLETIZED ROAD MARKING BINDERS AND RELATED METHODS

(71) Applicant: Kraton Polymers LLC, Houston, TX (US)

(72) Inventors: Adam Fasula, Jacksonville, FL (US); David Broere, Amsterdam (NL); Panagiotis Vlachos, Amsterdam (NL); Brett Neumann, Savannah, GA (US)

(73) Assignee: Kraton Polymers LLC, Houston, TX (US)

( * ) Notice: Subject to any disclaimer, the term of this patent is extended or adjusted under 35 U.S.C. 154(b) by 155 days.

(21) Appl. No.: 15/999,166

(22) Filed: Aug. 16, 2018

(65) Prior Publication Data

US 2019/0055704 A1  Feb. 21, 2019

Related U.S. Application Data

(60) Provisional application No. 62/546,507, filed on Aug. 16, 2017.

(51) Int. Cl.

| | |
|---|---|
| *C09D 5/00* | (2006.01) |
| *E01F 9/506* | (2016.01) |
| *B29B 9/06* | (2006.01) |
| *B29B 9/10* | (2006.01) |
| *B29B 9/12* | (2006.01) |
| *B29B 13/04* | (2006.01) |
| *C09D 5/33* | (2006.01) |
| *C09D 7/61* | (2018.01) |
| *C09D 7/65* | (2018.01) |
| *C08K 3/013* | (2018.01) |
| *C09D 193/04* | (2006.01) |
| *B29B 7/90* | (2006.01) |
| *C08L 93/04* | (2006.01) |
| *C09J 193/04* | (2006.01) |
| *B29K 31/00* | (2006.01) |
| *B29K 9/06* | (2006.01) |
| *B29B 9/16* | (2006.01) |
| *C08K 3/22* | (2006.01) |

(52) U.S. Cl.
CPC ............... *E01F 9/506* (2016.02); *B29B 7/90* (2013.01); *B29B 9/06* (2013.01); *B29B 9/10* (2013.01); *B29B 9/12* (2013.01); *B29B 13/045* (2013.01); *C08K 3/013* (2018.01); *C08L 93/04* (2013.01); *C09D 5/004* (2013.01); *C09D 7/61* (2018.01); *C09D 7/65* (2018.01); *C09D 193/04* (2013.01); *C09J 193/04* (2013.01); *B29B 2009/163* (2013.01); *B29K 2009/06* (2013.01); *B29K 2011/00* (2013.01); *B29K 2031/04* (2013.01); *B29K 2093/00* (2013.01); *C08K 2003/2241* (2013.01)

(58) Field of Classification Search
CPC .. C08L 9/06; C09D 5/004; C09D 7/61; C09D 7/65; C09D 193/04; E01F 9/506
USPC ........................................................ 523/172
See application file for complete search history.

(56) References Cited

U.S. PATENT DOCUMENTS

| | | | |
|---|---|---|---|
| 4,578,429 A | 3/1986 | Gergen et al. | |
| 5,453,320 A * | 9/1995 | Harper | B32B 25/04 428/356 |
| 5,972,421 A | 10/1999 | Finley | |
| 2004/0127614 A1 | 7/2004 | Jiang et al. | |
| 2015/0252195 A1 | 9/2015 | Kugel et al. | |
| 2016/0024338 A1 | 1/2016 | Puffer et al. | |
| 2016/0060495 A1 | 3/2016 | Neumann et al. | |
| 2017/0073513 A1 | 3/2017 | Flood et al. | |

FOREIGN PATENT DOCUMENTS

WO   1996041844 A1   12/1996

* cited by examiner

*Primary Examiner* — Edward J Cain
(74) *Attorney, Agent, or Firm* — Ramesh Krishnamurti

(57) ABSTRACT

A composition for use as a binder system for road marking formulations and methods for making thereof is disclosed. The binder system is provided as pellets. The method provides for making the pelletized binder system, and mixing the pelletized binder system with fillers and other components, heating the mixed ingredients forming into a molten mixture for applying on a road surface. The pelletized binder system comprises at least a resin and an elastomer in one embodiment; at least a resin and a plasticizer in a second embodiment; and at least a resin, an elastomer, and a plasticizer in a third embodiment.

14 Claims, No Drawings

PELLETIZED ROAD MARKING BINDERS AND RELATED METHODS

RELATED APPLICATIONS

This application claims priority from U.S. Provisional Application No. 62/546,507, with a filing date of Aug. 16, 2017, the entire disclosure is incorporated herein by reference.

FIELD

The disclosure relates to pelletized binder materials and compositions, and methods of making and applying them in road marking compositions.

BACKGROUND OF THE INVENTION

Road surface markings, e.g., pavement markings such as sheets, paints, tapes, raised pavement markers, and individually mounted articles, guide and direct motorists and pedestrians traveling along roadways and paths. Road surface markings can be formed using mechanical or non-mechanical devices. Mechanical road surface markers may be raised or recessed into the road surface, and can be either reflective or non-reflective. Examples of mechanical markers are Botts' dots and rumble strips. Non-mechanical markers may be formed by paint, thermoplastic, pre-formed polymer tape, epoxy and other methods.

Some road surface markings are used on roadways in longitudinal lines as edge and center-lines either as a continuous line or a skipped/dashed line. Some are used for transverse markings such as stop bars, chevrons, traffic taming markings, bike and pedestrian crossings, railroad crossings, or similar markings. They can be used on public and private highways, public and private properties, airports, and parking lots.

Road markings are typically used in a hot-melt application process for various types of traffic control indicia. They are non-reactive coatings systems composed of binder, pigment, glass beads, and inert fillers. Most US governmental agencies have their own internal and independent pavement marking specifications, normally based on some variation of AASHTO (American Association of State Highway Transportation Officials) designation M-249 and T-250, which is a federal specification that sets minimum and basic requirements of the materials to be used. For the European countries, specifications are set according to the European norms EN1871 and EN1427.

Conventional thermoplastic mix is supplied in powdered form, which makes it difficult to load into road marking machines. U.S. Pat. No. 5,972,421 discloses a method for making pelletized pavement marking mixtures to facilitate the handling of materials for use with road marking machines.

There is still a need for improved materials and compositions for use in road marking applications, i.e., forming a marked transportation surface.

SUMMARY OF THE INVENTION

In one aspect, a composition and method of producing a pelletized binder system is disclosed. The pelletized binder comprises: at least one resin selected from hydrocarbon resins, alkyd resins, and combinations thereof in an amount ranging from any of 10 to 96 wt. %; at least an elastomer in an amount of 1 to 40 wt. %; optional plasticizer selected from vegetable oils, process oils, phthalates and mixtures, in an amount of 10 wt. %; optional wax in an amount up to 10 wt. %; optional pigment in an amount of up to 15 wt. %; and optional filler in an amount of up to 50 wt. %. The binder system is characterized that at least two of the binder resin, the elastomer, and the plasticizer are combined together as pellets of a homogeneous composition prior to being combined with other components forming the road marking composition.

In another aspect, a method of producing road marking composition from a pelletized binder system is disclosed. The method comprises mixing at least a first resin, an elastomer, and optionally a plasticizer together, forming a pelletized binder. These binder pellets are subsequently mixed with other components such as a second resin (either the same as or different from the first resin), elastomers, plasticizers, waxes, pigments, glass beads and fillers forming a road marking composition. The pelletized binder system in one embodiment is present in an amount of 5-75 wt. % based on the total weight of the road marking composition.

In yet another aspect, a road marking composition comprising the pelletized binder system is disclosed, wherein the road marking composition is applied to a road surface by extrusion or a hot spray.

DESCRIPTION

The following terms will be used throughout the specification and will have the following meanings.

"Thermoplastic" means a polymeric or wax material that has the property of softening or melting, and becoming pliable when heated and of hardening and becoming rigid again when cooled.

"Transportation surface" refer to a surface to which the road marking compositions can be applied, including for example, aircraft runways and taxiways, roadways, walkways, bicycle paths, curbs, traffic barriers, barricades, steps, parking lots, metallic surfaces, oil rig decks, roofs, warehouse floors, and transportation-related horizontal, inclined or vertical surfaces. The surface can be concrete, asphalt or tile based.

"Pavement" means all possible transportation surfaces.

"Road marking" is used interchangeably with "pavement marking," means the application of a marking composition to a pavement.

"Pelletized binder," or "pelletized material," or "pellet binder system," or "binder system," may be used interchangeably with "binder composition," or "binder mixture" in pre-formed shapes, e.g., pellets, pastilles, etc., comprising at least a resin and an elastomer or a plasticizer.

"Miscible" or "miscibility" means the blending of two materials, e.g., two different resins, or a resin and a polymer, and the materials are miscible at the specific fractions if a single glass transition temperature ($T_g$) is obtained via Differential Scanning calorimetry (DSC) measurements. If two different glass transition temperatures are obtained, then the materials are immiscible.

Typical thermoplastic road markings are based on a thermoplastic binder system, retro-reflective material such as glass beads, pigments and fillers. The thermoplastic binder system of these road markings typically comprise resins, plasticizers, waxes and elastomers or plastomers. The disclosure relates to a novel thermoplastic road marking binder material, comprising at least a resin and an elastomer in one embodiment; at least a resin and a plasticizer in a second embodiment; at least a resin, an elastomer, and a plasticizer in a third embodiment; at least a resin, an elastomer and a wax in a fourth embodiment.

The pelletized binder system when applied in combination with other materials for road marking, minimizes the melting time required from charging to application, thus improving the output of road marking machines. In embodiments, different pelletized binder materials can be provided and mixed according to pre-determined recipes (e.g., in amounts of 10-25 wt. % total weight for the desired road marking application), with the addition of other materials (e.g., in amounts of 75-90 wt. %) such as additional binders, fillers, pigment, and retroreflective materials, and heated at the application site forming road marking materials.

Resin Component:

The pelletized binder system can be based on hydrocarbon resins, alkyd resins, and combinations thereof, in an amount such that when it is applied onto the pavement, it is present in an amount ranging from any of 10 to 35 wt. %, 12 to 30 wt. %, and less than 28 wt. % of the road marking composition.

Materials produced using hydrocarbon based resins are typically used in long-line or longitudinal applications, whereas alkyd formulations can be used in any application. Alkyd based thermoplastic binders typically comprise of one or more member selected from the group consisting of rosin resins, rosin esters and derivatives.

In one embodiment, the resin comprises rosin resins selected from the group of modified rosin resins and rosin esters, in an amount ranging from 10 to 96 wt. % of the pelletized binder system, or 10 to 30 wt. % of the marking composition as applied onto the pavement. Modified rosin resins comprise one or more component selected from the group of rosin acids, maleic anhydride or fumaric acid or maleic modified rosin esters (MMRE). Rosin acids, derived from trees as gum rosin, wood rosin, or tall oil rosin, are comprised of one or more component of the group consisting of abietic acid, neoabietic acid, dehydroabietic acid, levopimaric acid, pimaric acid, palustric acid, isopimaric acid, and sandarocopimaric acid. Rosin esters are comprised of one or more derivative obtained from the reaction of one or more rosin acids and one or more alcohol from the group of alcohols consisting of methanol, triethylene glycol, glycerol, and pentaerythritol. In one embodiment, the pelletized binder system comprises rosin ester having a softening point of between 95° C. and 120° C.

In some embodiment, the pelletized binder system comprises rosin ester resins selected from hydrogenated hydrocarbon rosin esters, acrylic rosin esters, disproportionation rosin esters, dibasic acid modified rosin esters, polymerized resin esters, phenolic modified rosin ester resins, and mixtures thereof. In other embodiments, the binder comprises a mixture of maleic modified glycerol ester and pentaerythritol ester of rosin resins.

In some embodiments, the pelletized binder system comprises a hydrocarbon resin in an amount ranging from 30 to 90 wt. % of the pelletized binder system, or 10 to 30 wt. % of the road marking composition as applied onto the pavement. Examples of hydrocarbon resins include resins selected from the group of C5 aliphatic hydrocarbon resins, C9 aromatic hydrocarbon resins, and C5/C9 hydrocarbon blend. C5 aliphatic hydrocarbon resins are produced from distillation reactions in the presence of a Lewis catalyst, of piperylene which comprises one or more components of the group of trans-1,3-pentadiene, cis-1,3-pentadiene, 2-methyl-2-butene, dicyclopentadiene, cyclopentadiene, and cyclopentene. C9 aromatic hydrocarbon resins are a byproduct of naptha cracking of petroleum feedstocks used to produce C5 aliphatic resins, comprising one or more components of the group consisting of vinyltoluenes, dicyclopentadiene, indene, methylstyrene, styrene, and methylindenes.

In one embodiment, the resin for use in the pelletized binder is of the type that is immiscible in the elastomer/plastomer component to minimize the remassing of the blend product pellets during shelf storage, so they remain free flowing when delivered to customers for use in making road marking compositions. The immiscible resin is present in an amount of 5 to 25 wt. % based on the final weight of the road marking composition, and in an amount of 25-100% of the total amount of resin(s) used in the road marking composition.

The immiscible resin is moderately or highly modified, so when the elastomer/plastomer is blended into the immiscible or insoluble continuous phase of the resin, the elastomer/plastomers will ball up as a tight coil, preventing or minimizing the remassing. Examples of immiscible resins include but are not limited to maleated rosin ester, fumarated rosin ester, acrylated rosin ester, amidated rosin ester (amine modified), nitrated rosin ester, chlorinated rosin ester, brominated rosin ester, and mixtures thereof. In one embodiment, the immiscible resins are selected from maleated rosin, fumarated rosin, and acrylated rosin.

Elastomer/Plastomer Component:

In some embodiments, the pelletized binder system comprises a high-elongation rate elastomer to provide flexibility, improve impact resistance and abrasion resistance. In one embodiment, the amount of elastomer ranges from 1 to 70 wt. % of the pelletized binder system, or 0.1 to 10 wt. % of the road marking composition as applied onto the pavement.

Examples of elastomers include but are not limited to natural rubber (NR), isoprene rubber (IR), styrene-butadiene rubber (SBR), chloroprene rubber (CR), butadiene rubber (BR), nitrile butadiene rubber (NBR), isobutylene-isoprene rubber (IIR), ethylene-propylene diene monomer (EPDM), urethane rubber (UR), silicone rubber (SR), fluorocarbon rubber (FR), styrene-isoprene-styrene rubber (SIS), styrene-butadiene-styrene rubber (SBS), styrene-ethylene/butylene-styrene (SEBS), styrene-ethylene/propylene-styrene (SEPS), ethyl vinyl acetate (EVA), graft copolymers of EVA with another monomer such as vinyl chloride, a hot-melt polyamide resin, and mixtures thereof. These polymers disperse readily when incorporated into the pelletized binder system at melting temperatures of 180° C. to 220° C.

In one embodiment, the polyamide is selected from the group of aliphatic polyamide, cycloaliphatic polyamide, partly aromatic polyamide, and a mixture thereof. In another embodiment, the polyamide is a resin based on dimer acid having a softening point of 120-130° C. and an elongation % of at least 275.

In one embodiment, the rubber is selected from the group of styrene-isoprene-isoprene (SIS) block copolymers with a styrene/rubber ratio of at least 15:85 and elongation at break % of at least 1000. In another embodiment, the rubber is selected from styrene butadiene styrene (SBS) polymers with a styrene/rubber ratio of at least 20:80, and elongation at break % of at least 600. In yet another embodiment, the elastomer is a styrene-ethylene/butylene-styrene (SEBS) or styrene-ethylene/propylene-styrene (SEPS) block copolymer, e.g., KRATON G-series specialty polymers from Kraton Corp., with a styrene/rubber weight ratio ranging from 10:90 to 35:65, elongation at break (%) of at least 200 and preferably at least 500, and a Brookfield Viscosity, mPa·s (or cP) (25% wt. neat polymer concentration in toluene at 25°

C.) in the range of 1500-10000. In another embodiment, the elastomer is a SEBS polymer with a styrene/rubber weight ratio of at least 30:70.

In one embodiment, the elastomer is a functionalized rubber, e.g., SEBS polymer with maleic anhydride (MA) grafted onto the rubber midblock, e.g., having 1 to 3 wt. % maleic anhydride. The MA grafting improves the adhesion of the binder system to other components in a road marking composition. Examples of grafted elastomers are described in U.S. Pat. No. 4,578,429 which is incorporated by herein by reference.

In one embodiment, the elastomer is a block copolymer having a molecular weight in the range of from 20,000 to 500,000, and containing at least one predominantly poly (conjugated diene) block which may optionally have been hydrogenated and at least two predominantly poly(vinylaramotic) blocks. In embodiments, the elastomer is added in the form of a powder, having particles smaller than 2000 µm, or in the form of porous pellets.

Plasticizer Component:

In embodiments, instead of or in addition to the elastomer component, the pelletized binder system comprises at least a plasticizer selected from the group of vegetable oils, process oils, mineral oils, phthalates and mixtures, in an amount ranging from 1 to 20 wt. % of the pelletized binder system, or 0.1 to 10 wt. % of the road marking composition as applied onto the pavement.

Process oils are comprised of one or more components of the group consisting of paraffinic oils, naphthenic oils, and aromatic oils. Paraffinic oils are saturated carbon backbones, naphthenic oils have polyunsaturated carbon structure with little aromatic content, and aromatic oils have cyclic carbon unsaturation resulting aromatic classification. Phthalates are comprised of one or more components from the group consisting of dimethyl phthalate, diethyl phthalate, diallyl phthalate, di-n-propyl phthalate, di-n-butyl phthalate, diisobutyl phthalate, butyl cyclohexyl phthalate, di-n-pentyl phthalate, dicyclohexyl phthalate, butyl benzyl phthalate, di-n-hexyl phthalate, diisohexyl phthalate, diisoheptyl phthalate, butyl decyl phthalate, butyl(2-ethylhexyl) phthalate, di(n-octyl) phthalate, diisooctyl phthalate, n-octyl n-decyl phthalate, diisononly phthalate, di(2-prpoylheptyl) phthalate, diisodecyl phthalate, diundecyl phthalate, diisoundecyl phthalate, ditridecyl phthalate, and diisotridecyl phthalate.

Vegetable oils, called triglycerides because they are the resultant reaction of fatty acids with glycerol, and synthetic alkyd oils are made of fatty acid esters of varying composition. The fatty acids found in their structure are comprised of one or more components of the group consisting of ricinoleic acid, oleic acid, linoleic acid, linolenic acid, stearic acid, palmitic acid, dihydroxy stearic acid, myristic acid, myristoleic acid, palmitoleic acid, sapeinic acid, elaidic acid, vaccenic acid, alpha-linolenic acid, arachidonic acid, eicosapentaenoic acid, erucic acid, docosahexaenoic acid, caprylic acid, capric acid, lauric acid, arachidic acid, behenic acid, lignoceric acid, and cerotic acid. Phthalates are comprised of one or more components from the group consisting of dimethyl phthalate, diethyl phthalate, diallyl phthalate, di-n-propyl phthalate, di-n-butyl phthalate, diisobutyl phthalate, butyl cyclohexyl phthalate, di-n-pentyl phthalate, dicyclohexyl phthalate, butyl benzyl phthalate, di-n-hexyl phthalate, diisohexyl phthalate, diisoheptyl phthalate, butyl decyl phthalate, butyl(2-ethylhexyl) phthalate, di(n-octyl) phthalate, diisooctyl phthalate, n-octyl n-decyl phthalate, diisononly phthalate, di(2-prpoylheptyl) phthalate, diisodecyl phthalate, diundecyl phthalate, diisoundecyl phthalate, ditridecyl phthalate, and diisotridecyl phthalate.

Optional Waxes:

Waxes can be added to the dry mixes comprising the pelletized binder materials at the application site, for a heated road marking mixture for application to the road surface, in an amount ranging from 1 to 20 wt. % of the pelletized binder system, or 1 to 10 wt. % of the wad limiting composition as applied onto the pavement. In other embodiment, the waxes are added to the blend of resin and elastomer and/or plasticizer, forming the pelletized binder system.

The waxes can be any of vegetable waxes, petroleum derived waxes, and synthetic waxes. Vegetable waxes used in thermoplastics are normally naturally occurring mixtures of long-chain aliphatic hydrocarbons, containing esters of fatty acids and alcohols. The fatty acids are comprised of one or more component of the group consisting of ricinoleic acid, oleic acid, linoleic acid, linolenic acid, stearic acid, palmitic acid, dihydroxy stearic acid, myristic acid, myristoleic acid, palmitoleic acid, sapeinic acid, elaidic acid, vaccenic acid, alpha-linolenic acid, arachidonic acid, eicosapentaenoic acid, erucic acid, docosahexaenoic acid, caprylic acid, capric acid, lauric acid, arachidic acid, behenic acid, lignoceric acid, and cerotic acid. The alcohols are comprised of one or more members selected from the group consisting of glycerol, ethanol, methanol, pentaerythritol, iso-propanol, isopropyl alcohol, butanol, dihydroxy butanol, or any other mono-functional or multi-functional alcohol a varying long-chain aliphatic hydrocarbon backbone.

Petroleum derived waxes are comprised of one or more member selected from the group consisting of saturated n-alkanes, iso-alkanes, napthenes, alkyl-substituted aromatic compounds, and napthene-substituted aromatic compounds. Synthetic waxes can be polyethylene, Fischer-Tropsch waxes, chemically modified waxes, or amide modified waxes. Polyethylene waxes generally have the chemical formula $(C_2H_4)_nH_2$ and are comprised, based on branching and chemical structure, of one or more component of the group consisting of ultra-high-molecular-weight polyethylene (UHMWPE), high-density polyethylene (HDPE), cross-linked polyethylene (PEX or XLPE), medium-density polyethylene (HDPE), linear low-density polyethylene (LLDPE), low-density polyethylene (LDPE), very-low-density polyethylene (VLDPE), and copolymers. Fischer-Tropsch waxes generally have the chemical formula $(C_nH_{(2n+2)})$.

Chemically modified waxes are converted from non-polar to polar molecules by the incorporation of a functional chemical group comprising one or more component consisting of a hydroxyl group, a carboxyl group, a salt, an ester group, and an acid group. Amide modified waxes are chemically modified waxes that have amide functional molecules grafted to the polyethylene molecule to modify flexibility, adhesion, or system compatibility of the wax.

Optional Pigments:

In embodiments, pigments are added to the pelletized marking materials at the application site for a heated road marking mixture to apply to the road surface. In other embodiment, the pigments are added to the blend of resin and elastomer/plasticizer, then extruded forming pelletized road marking materials. An exemplary composition for the amount of pigments in a road marking mixture is as follows: resin+plasticizer+elastomer materials 15-30%, pigments 3-15%, and fillers such calcium carbonate in an amount of 25-50% and glass beads in an amount of 25-50%.

The pigments can be of different colored materials. The pigment for white materials is predominately Type II rutile titanium dioxide. The pigment for yellow materials is an organic based yellow pigment which can be a combination of yellow and red or orange pigments designed to withstand high temperatures and provide UV resistance and weatherability. The pigment can be Rutile Type II titanium dioxide with a minimum purity of 92% for white materials, and a combination of titanium dioxide and organic or other heavy metals free yellow pigments for yellow materials.

Optional Fillers/Aggregates:

Fillers and/or aggregates are used to extend the thermoplastic resin, and confer some special properties on the eventual marking. Fillers can be added at the production site to the pelletized binder system, or in some embodiments, some of the fillers can be optionally added to form the pelletized binder system. The amount of fillers in a road marking composition as applied onto the pavement typically ranges from 25 to 50 wt. %.

In one embodiment, fillers are ground calcium carbonate of various particle size based on desired flow characteristics. In other embodiments, fillers comprise glass beads/microbeads selected based on size, quality, and concentration specified by the applicable governmental requirement. In yet other embodiments, fillers are any of sand, mica, cracked stone, calcined flit, quartate or crushed marble, and mixtures thereof.

In one embodiment, glass beads are incorporated into the material so that as the material degrades under UV, water, and traffic exposure, the glass beads will become exposed and serve as reflective elements for nighttime visibility while under illumination from vehicles' headlamps. In other embodiments, fillers including sharps (grains of crushed, hard mineral) are used in order to improve the abrasion resistance of the marking and possibly also so that the eventual marking shall have a rough surface so that it is not slippery when wet.

In one embodiment, the marking material includes microcrystalline ceramic beads for high refractive index quality, for a durable optics system that returns more light to drivers than typical glass beads. Certain embodiments of the microcrystalline bead structure and elements include rare earth elements, with some materials having glow in the dark attributes that improve safety for drivers.

Exemplary Compositions:

Non-limiting illustrative examples of pelletized binder compositions include: a) a pelletized binder system with 96% of a resin such as rosin ester and 4% of an elastomer such as styrene-isoprene-styrene rubber (SIS); b) a pelletized binder system with 62% of rosin ester and 37.5% of SIS; c) a pelletized binder composition with 78% of rosin ester, 11% of SIS, and 11% of a rejunevator such as Sylvaroad™ RP1000 from Kraton Corporation; c) a pelletized binder composition with 17.9% of rosin ester, 2.6% of SIS, 2.6% of plasticizer, 12.8% of $TiO_2$, and 64.1% of filler; d) a road marking composition with 20% in the form of pelletized binder materials, 35% as fillers and pigments, and 35% as glass beads.

Properties:

The binder system with a combination of a resin, e.g., rosin and/or hydrocarbon based resins, elastomers and/or plasticizers, is used in road marking materials by combining with other materials including fillers. Road marking materials incorporating pelletized binder system comprising rosin based resins and elastomers demonstrate increased durability, imparting compositional and physical properties outlined in Federal Specification AASHTO M249 or European norm EN1871.

A road marking composition incorporating a pelletized binder system with a combination of a resin and at least an elastomer selected from SIS, SEBS, SEPS, SBC and combinations thereof, demonstrates superior erosion resistance of at least 100% improvement over a road marking composition without the elastomer component in one embodiment; at least 150% improvement in erosion resistance in a second embodiment; and at least 200% improvement in erosion resistance in a third embodiment. In one embodiment, a road marking composition incorporating a pelletized binder system with a resin and at least an elastomer shows excellent erosion resistance of at least $3*10^6$ wheel passages.

Besides showing improved erosion resistance properties, the use of the pelletized binder system, which is a solid and homogenous product, facilitates increased process control, monitoring, and efficiency at the application site. The use of a two-component pelletized binder system (e.g., a resin and an elastomer) or a three-component pelletized binder system (e.g., resin, an elastomer, and a plasticizer) in conjunction with other materials such as fillers, pigments, etc., results in a reduction in preparation time (heating/melting/and extrusion) of at least 15% over an application with all the ingredients being added, heated, melted and mixed together as is.

Method for Making Pelletized Binder System:

The components, e.g., resin, elastomer and/or plasticizer, optional pigments, optional materials are combined together then pelletized by a variety of methods. The exact method used to pelletize the extruded, substantially homogeneous pavement marking binder system depends on the types and characteristics of the components used in forming the pellets. For example, pelletization methods commonly known as granulation or briquetting, mixing agglomeration and extrusion agglomeration can be used to pelletize, forming a substantially homogeneous pavement marking binder system. In some embodiments, when extrusion agglomeration is used, the substantially homogeneous pavement marking mixture can be pelletized directly from the reaction vessel.

In one embodiment, the molten components are first mixed together in a reactor to form a homogenous mixture, then fed into an extruder forming strands, which are subsequently cut into pellets or are fed onto a pelletizing belt through pumping the hot liquid into a cylindrical stator whereby the liquid is pushed through a perforated shell onto the cooling belt. In one embodiment, after the pellets are formed, they are coated with an adhesion inhibiting agent to remove/reduce clumping during storage and transit. Examples of adhesion inhibiting agents include but are not limited to talc, chalk, and silica.

The pellets can differ in size, pigment, as well as refractive index depending on the type and ratio of components in the raw material mix. In one embodiment, the pellets are of the size that is not too large, e.g., less than 50 $cm^3$. In another embodiment, at least 75% of the pellets are formed to have a volume of less than 25 $cm^3$. In a third embodiment, at least 90% of the pellets have a volume between 0.125 and 4 $cm^3$.

The pelletized binder system is packaged in bags are shipped to a road marking manufacturer, where a finished dry mix road marking composition is produced. The finished dry mix road marking is then transported to the job side to be applied onto the road.

Methods for Applying/Customizing Marking Materials for Applications:

At the application site, a road marking composition employing the binder system (pellets) is melted using conventional equipment and applied directly onto the road surface. The molten road marking composition can be applied by any of spray, ribbon extrusion, spray extrusion, screed extrusion application techniques. The solid binder pellets save time and energy during a road marking process because they melt to homogenize more easily than typical dry blends of binder components. In one embodiment, the pelletized binder system contains all ingredients necessary to form the adhesive for a marking, to which additional components such as pigments, fillers, waxes, etc., or pellets containing a different thermoplastic binder, may be optionally added as determined by local conditions of application.

In one embodiment, the "additional" components include a $2^{nd}$ resin that is different from the $1^{st}$ resin in the pelletized binder system, with the $2^{nd}$ resin being miscible or compatible with both the $1^{st}$ resin and the elastomer polymer in the pelletized binder system. The use of the pelletized binder system including the $1^{st}$ immiscible resin minimizes the amount of remassing of the pellets in storage and transport and also minimizes the melting and blending time required before application to the road, while the $2^{nd}$ miscible resin allows the elastomer to change configuration as the road marking composition is melted and blended to impart flexibility, with the resulting traffic stripe or marking to have excellent flexibility, toughness, glass adhesion thus maximizing service time.

Miscible $2^{nd}$ resins for blending with the pelletized binder system (containing a $1^{st}$ resin that is immiscible with the polymer in the pelletized binder) include but are not limited to rosin esters, which are miscible with both polymers such as styrene butadiene styrene (SBC) and maleic modified glycerol rosin esters (as $1^{st}$ resin). Examples include pentaerythritol ester of hydrogenated rosin, glycerol esters), hydrocarbon esters such as piperlyene and isoprene, both hydrogenated and not hydrogenated, styreneated hydrocarbon resins, and terpene based resins such as terpene phenolic, styreneated terpene, and polyterpene resins. With the addition of the $2^{nd}$ resin that is compatible with both the $1^{st}$ resin and the polymer in the pelletized binder, the miscibility goes up allowing the polymer in the pellets to "uncoil." thus enhancing the properties of the mix as intended, increasing the flexibility, toughness, and bead adhesion of the final road marking composition.

With the binder material being pelletized and of substantially homogenous composition, it melts easily and rapidly for blending into the marking composition in an amount ranging from 5-75 wt. % based on the total weight of the marking composition. The amount to be added depends on whether components such as pigments, fillers, are already incorporated into the binder material, or other ingredients are added at the production location prior to shipping it to the application site. The melting temperature and the mixing time is dependent on the types and amounts of resins and elastomers employed in the binder material, e.g., ranging from 150° C. to 225° C., and in one embodiment, at a temperature of 200° C. or less. At location, the pellets together with the additional components can be fed directly from pellet hopper(s) to a mixing/melting tank, then an extruder optionally fitted with a heating chamber. After the marking material passes through the extruder, it emerges as a hot flat strip to be laid directly onto the surface to be marked as the vehicle travels along. In some embodiments, glass microbeads may be distributed over the still hot marking so that they adhere to the marking to provide retro-reflective properties.

In some embodiments, the pelletized materials are use in "tankless" application operations. In a "tankless" process, no material would be heated in melt vessels or kettles. The pellets or particles would be added manually, pneumatically, or by other automatic or semi-automatic conveyance to a system of pipes and extruders capable of heating the material "on-demand" and without any preheating.

If generic pellets are used, before the homogenous mass is applied to the road surface a pigment, as well as retroreflective particles, high-reflective index beads such titanium-stabilized beads, etc., can be added in amounts required by local regulations or suitable for the application. The mass formed from pavement marking mixtures can be applied to a road surface as a hot spray. The mass formed from pavement marking mixtures can also be applied to a road surface by screed extrusion and ribbon extrusion methods. Immediately after application, retroreflective particles are scattered over the surface of the pavement markings to enhance the initial retroreflectance of the pavement markings. After being applied to the road surface, pavement marking mixtures can be set up quickly to form finished pavement markings that are retroreflective and resistant to weathering. Pavement markings formed may retain their retroreflective characteristics for relatively long periods because at least a portion of the retroreflective particles that form a part of the substantially homogeneous pelletized mixture is embedded below the surface of the pavement marking, and thus is more resistant to wear, the particles becoming exposed and functional as the marker wears away.

As binder materials in pre-formed shapes, e.g., pellets, strands, pastilles, etc., can be more conveniently handled at the production site compared to the handling of powdered mixtures and in a shorter amount of time, the disclosure herein provides a system and methods to customize binder materials.

A software can be pre-programed to handle different recipes for a plurality of components, pre-blends, and blends customized for a particular application, adding additives to any of pellets comprising binder(s) and elastomer(s), pellets comprising binder(s) and plasticizer(s), pellets comprising various binders with plasticizer(s), pellets comprising mixtures of binder(s), elastomer(s) and plasticizer(s), pellets comprising alkyd resin and elastomer(s), pellets comprising hydrocarbon resin and elastomer(s), etc.

The pelletized binder system can also be used in applications other than road marking. The pelletized binder can be conveniently added or used in roofing applications (e.g., roofing felts), adhesive applications, road construction and repair applications such as polymer-modified asphalt, or polymer modified asphalt emulsions. In one embodiment, the pellets are added to a bitumen and mixed at a temperature from 300-500° F., and then mixed to already prepared asphalt emulsion at ambient temperature.

EXAMPLES

The following illustrative examples are non-limiting.

Examples 1-15

In the examples, pellets are prepared from pre-blends in the portions as shown in Table 1. In examples 12-15, each binder mixture consists of a resin (e.g., a rosin ester) and an elastomer (e.g., SIS, SEBS, SEPS, MA grafted SEBS, etc.).

In examples 4-11, each binder mixture further comprises at least a plasticizer, e.g., a process oil or in some embodiments, a rejuvenator oil such as SYLVAROAD RP-1000 from Kraton Corp., or ANOVA rejuvenator oil from Cargill Corp. In examples 1-5, fillers or fillers and pigments are incorporated into the pre-blend mixtures. The mixtures form a homogenous composition and then is pelletized by extrusion.

Examples 16-31

The pre-blend pellets of examples 1-15 are used to form pavement marking mixtures for examples 16-31 respectively (i.e., example 1 pellets are used to form marking composition in example 16, example 2 pellets are used in example 17, etc.). As shown in Table 2, for some examples (examples 16-17), only glass beads are added to the pellets to form the final marking composition. In some examples (e.g., examples 23, 26, and 29), additional resins which can be the same or a different resin, e.g., a rosin ester, a hydrocarbon resin, or mixtures thereof, are added. In other examples (examples 23, 26-30), the same or a different plasticizer is added to the pellets and glass filers. In all examples, the mixture of pellets and additional components are heated to at least 180° C. to obtain a homogenous composition, before application to a surface.

Example 31

All components are based on 100 parts of binder composition. A binder consist of 75 part of rosin resin, 5 parts of styrenic block co polymer, 10 parts of PE-wax and 10 part of plasticizer are mixed together to form a homogenous pellet by extrusion process. Together with glass beads, calcium carbonate and titanium dioxide, the binder system forms a pavement marking mixture by heating it to 200° C. or 392° F. for a 4-6 hour period to obtain a homogenous mixture, before it is applied of a surface.

Example 32

A pre-blend of styrenic block copolymer and rosin ester is prepared. 70 parts of a styrenic block co polymer and 30 parts of Sylvatac™ RE101RM rosin ester from Kraton Corporation are mixed together to form a homogenous binder system pellet by extrusion process. The binder system pellets are packaged for shipment to a formulator for later incorporation into a road marking or other composition.

Example 33

A pre-blend of 20 part of a linear triblock copolymer based on styrene and isoprene with a polystyrene content of 15% mass, and 80 parts of a rosin ester having a softening point $T_{sp}$ of 103° C., acid value of 9 mg KOH/g, and glass transition temperature of 53° C. are mixed together in a reactor with low shear stirring at a temperature of 180° C. or 356° F. The process is monitored until the viscosity and softening point are stabilized. This binder material is then pelletized and packaged. It is noted that clumps of fused pellets are formed ("remassing") after 24 hour storage at room temperature.

Example 34

Example 33 is repeated, except that the rosin ester resin is a maleated glycerol ester type, having a $T_{sp}$ of 107° C., acid value of 38 mg KOH/g, and glass transition temperature of 63° C. Very little if any clumping or fusing of the pellets is observed after 24 hours storage at room temperature.

Example 35

All components are based on 100 parts of binder composition. A binder consist of 60 parts of a C-5 resin (or hydrogenated C-5 or hydrogenated C9), 15 parts of a rosin resin, 5 parts of a styrene-isoprene-styrene co-polymer, 10 parts of PE-wax and 10 part of plasticizer are mixed together to form homogenous pellets by extrusion process. Together with glass beads, calcium carbonate and titanium dioxide, the binder system forms a pavement marking composition by heating to 200° C. or 392° F. in a stirred vessel to obtain a homogenous molten mixture, which can then be applied to a pavement.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

Unless otherwise specified, all technical and scientific terms used herein have the same meanings as commonly understood by one of skill in the art to which the disclosed disclosure belongs. the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

TABLE 1

Road Marking Binder System - Pellets for use by formulator in road marking composition

| Example | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| Resin | 20.0 | 18.6 | 28.0 | 45.8 | 41.7 | 53.8 | 88.9 | 77.8 | 66.7 | 84.6 | 92.3 | 69.2 | 93.3 | 87.5 | 62.5 | 83.3 | 96.0 |
| Elastomer | 2.9 | 2.1 | 4.0 | 4.2 | 8.3 | 7.7 | 5.6 | 11.1 | 27.8 | 7.7 | 3.8 | 23.1 | 6.7 | 12.5 | 37.5 | 14.7 | 4.0 |
| Wax | — | 2.1 | 0.0 | — | — | — | — | — | — | — | — | — | — | — | — | 2.0 | — |
| Plasticizer | 2.9 | 2.9 | 4.0 | 4.2 | 4.2 | 7.7 | 5.6 | 11.1 | 5.6 | 7.7 | 3.8 | 7.7 | 0.0 | 0.0 | 0.0 | — | 0.0 |
| Pigment | 14.3 | 14.3 | 8.0 | 4.2 | 0.0 | 0.0 | 0.0 | 0.0 | 0.0 | 0.0 | 0.0 | 0.0 | 0.0 | 0.0 | 0.0 | — | 0.0 |
| Filler | 60.0 | 60.0 | 56.0 | 41.7 | 45.8 | 30.8 | 0.0 | 0.0 | 0.0 | 0.0 | 0.0 | 0.0 | 0.0 | 0.0 | 0.0 | — | 0.0 |
| Total Pellet | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |

TABLE 2

Road Marking Compositions formulated by formulator

| Example | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| Pellet | 70.0 | 70.0 | 50.0 | 48.0 | 48.0 | 29.0 | 20.0 | 20.0 | 7.2 | 26.0 | 26.0 | 8.7 | 19.0 | 16.0 | 5.4 | 11.2 | 18.0 |
| Resin | — | — | — | — | — | — | — | — | 11.2 | — | — | 16.0 | — | — | 12.6 | 4.8 | — |
| Elastomer | — | — | — | — | — | — | — | — | — | — | — | — | — | — | — | — | — |
| Wax | — | — | — | — | — | — | — | — | — | — | — | — | — | — | — | — | — |
| Plasticizer | — | — | — | — | — | — | — | — | 1.6 | — | — | 1.3 | 1.0 | 2.0 | 2.0 | 2.0 | 2.0 |
| Pigment | — | — | — | 2.0 | 2.0 | 10.0 | 10.0 | 10.0 | 10.0 | 2.0 | 10.0 | 10.0 | 2.0 | 10.0 | 10.0 | 10.0 | 2.0 |
| Filler | — | — | — | 15.0 | 15.0 | 26.0 | 35.0 | 35.0 | 35.0 | 37.0 | 29.0 | 29.0 | 38.0 | 22.0 | 30.0 | 35.0 | 38.0 |
| Glass Beads | 30.0 | 30.0 | 50.0 | 35.0 | 35.0 | 35.0 | 35.0 | 35.0 | 35.0 | 35.0 | 35.0 | 35.0 | 40.0 | 50.0 | 40.0 | 37.0 | 40.0 |
| Total | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |

The invention claimed is:

1. A pelletized binder composition for use in road marking applications, based on total weight of the binder composition, consisting essentially of:
   an alkyd resin selected from rosin resins, modified rosin resins, rosin esters, rosin ester derivatives, and combinations thereof in an amount of 20 to 96 wt. %;
   an elastomer selected from styrene-isoprene-styrene rubber (SIS), styrene-butadiene-styrene rubber (SBS), styrene-ethylene/butylene-styrene (SEBS), and SEBS rubber having 1 to 3 wt. % maleic anhydride (MA) grafted onto the rubber midblock, in an amount of 1 to 40 wt. %;
   an optional plasticizer selected from vegetable oils, mineral oils, process oils, phthalates and mixtures, in an amount up to 10 wt. %;
   wherein the resin, the elastomer, and the optional plasticizer are combined together as pellets of a homogeneous composition prior to being combined with other components forming the pelletized binder composition for use in road marking compositions.

2. The pelletized binder composition of claim 1, wherein the alkyd resin and the elastomer are immiscible, for the elastomer to form an insoluble dispersed phase in the resin as a continuous phase.

3. The pelletized binder composition of claim 2, wherein the alkyd resin is selected from maleated rosin, fumarated rosin, acrylated rosin, amidated rosin, nitrated rosin, chlorinated rosin, brominated rosin, and mixtures thereof.

4. The pelletized binder composition of claim 1, wherein the plasticizer is present in an amount of up to 15 wt. %, and wherein the alkyd resin and the optional plasticizer are combined together as pellets of a homogeneous composition prior to being combined with the elastomer.

5. The pelletized binder composition of claim 1, wherein the plasticizer is present in an amount of up to 15 wt. % and wherein the elastomer and the plasticizer are combined together as pellets prior to being combined with the alkyd resin.

6. The pelletized binder composition of claim 1, wherein the pelletized binder composition is heated up to a temperature of less than 225° C. for blending into a road marking composition in an amount ranging from 5-75 wt. % based on the total weight of the road marking composition.

7. The pelletized binder composition of claim 1, wherein the alkyd resin is a modified rosin resin comprising rosin acids, and wherein the rosin acids comprise one or more member selected from the group consisting of abietic acid, neoabietic acid, dehydroabietic acid, levopimaric acid, pimaric acid, palustric acid, isopimaric acid, and sandaro-copimaric acid.

8. The pelletized binder composition of claim 1, wherein the alkyd resin is a rosin ester derivative obtained by reacting one or more rosin acids with one or more alcohols selected from methanol, triethylene glycol, glycerol, and pentaerythritol.

9. A road marking composition comprising the pelletized binder composition of claim 1, wherein the pelletized binder composition is present in an amount of 5-75 wt. % based on the total weight of the road marking composition.

10. A road marking composition comprising the pelletized binder composition of claim 2, wherein the road marking composition further comprises a second resin that is miscible with the alkyd resin and the elastomer in the pelletized binder composition.

11. The road marking composition of claim 10, wherein the second resin is selected from the group of: pentaerythritol ester of hydrogenated rosin, pentaerythritol ester of non-hydrogenated rosin, glycerol rosin esters, hydrocarbon resins, styreneated hydrocarbon resins, terpene phenolic resins, styreneated terpene resins, and polyterpene resins.

12. A method for forming a road marking composition comprises:

provide pellets of a homogeneous composition comprising at least an alkyd resin selected from, rosin resins, modified rosin resins, rosin esters, rosin ester derivatives and combinations thereof in an amount of 20 to 96 wt. %; an elastomer selected from styrene-isoprene-styrene rubber (SIS), styrene-butadiene-styrene rubber (SBS), styrene-ethylene/butylene-styrene (SEBS), and SEBS rubber having 1 to 3 wt. % maleic anhydride (MA) grafted onto the rubber midblock in an amount of 1 to 40 wt. %, and optionally a plasticizer selected from vegetable oils, process oils, phthalates and mixtures, in an amount of 0.1 to 10 wt. %; and mixing the pellets with a composition comprising waxes, pigments, and fillers to form the road marking composition.

13. The method of forming a road marking composition of claim 12, wherein the alkyd resin and the elastomer are immiscible; and wherein the pellets are mixed with composition comprising waxes, pigments, fillers, and a second resin that is miscible with the alkyd resin and the elastomer in the pelletized binder composition to form the road marking composition.

14. The method of forming a road marking composition of claim 12, further comprising applying the road marking composition to a road surface by extrusion or a hot spray.

\* \* \* \* \*